United States Patent [19]
Zimmerly

[11] Patent Number: 6,045,033
[45] Date of Patent: Apr. 4, 2000

[54] PIPE CONNECTION AND METHOD

[75] Inventor: Robert D Zimmerly, Kenosha, Wis.

[73] Assignee: Tri-Clover, Inc., Kenosha, Wis.

[21] Appl. No.: 09/053,962

[22] Filed: Apr. 2, 1998

[51] Int. Cl.[7] .......................... B23K 31/02; B21D 39/00; F16L 47/00; F16L 17/00

[52] U.S. Cl. .......................... 228/189; 228/142; 228/171; 285/288.1; 285/336; 285/367

[58] Field of Search ................... 228/170, 171, 228/172, 203, 142, 261; 285/288.1, 336, 367; 138/155, 120, 109

[56] References Cited

U.S. PATENT DOCUMENTS

| | | |
|---|---|---|
| 2,780,483 | 2/1957 | Kessler . |
| 2,789,844 | 4/1957 | Kessler . |
| 3,575,432 | 4/1971 | Taylor ...................................... 285/367 |
| 3,603,280 | 9/1971 | Zahuranec ............................. 116/114.5 |
| 3,674,292 | 7/1972 | Demler, Sr. .............................. 285/174 |
| 3,694,010 | 9/1972 | Callahan, Jr. ......................... 285/334.4 |
| 4,357,512 | 11/1982 | Nishimoto et al. . |
| 4,458,924 | 7/1984 | Schlicht . |
| 4,605,156 | 8/1986 | Stenger et al. . |
| 4,641,775 | 2/1987 | Lande et al. . |
| 4,899,567 | 2/1990 | Lenglet et al. . |
| 5,076,617 | 12/1991 | Bronnert . |
| 5,275,440 | 1/1994 | Esser . |
| 5,328,210 | 7/1994 | Stafford et al. . |
| 5,332,267 | 7/1994 | Harrison ..................................... 285/23 |
| 5,350,200 | 9/1994 | Peterson et al. ........................... 285/92 |
| 5,447,339 | 9/1995 | Marchal et al. . |
| 5,489,405 | 2/1996 | Holbert et al. . |
| 5,509,702 | 4/1996 | Warehime et al. ...................... 285/409 |
| 5,858,311 | 1/1999 | Bachtel ................................... 422/109 |
| 5,904,382 | 5/1999 | Bronnert ................................. 285/349 |

OTHER PUBLICATIONS

"Metals Handbook". ASM. vol. 6, 1983, p. 866.
"Design of Welded Structure". Blodgett. 1966, p. 7.7–1 to 7.7–2.

Primary Examiner—Patrick Ryan
Assistant Examiner—Kiley Stoner
Attorney, Agent, or Firm—Ryan Kromholz & Manion, S.C.

[57] ABSTRACT

A method of forming lengths of pipe for assembly together to form fluid flow conduits includes the steps of providing a pipe having a first inner diameter and a central longitudinal axis, providing a ferrule which has an annular first end, having an inner diameter equal to the pipe inner diameter and having a second end formed into a flange adapted to form a flange coupling when abutted against and connected to another similar flange. The flanges have end faces countersunk approximately 1° to 5°. The first end of each ferrule is welded to an end of a pipe, whereby the end face of the flange assumes an orientation wherein the end face is substantially normal to the central longitudinal axis.

3 Claims, 2 Drawing Sheets

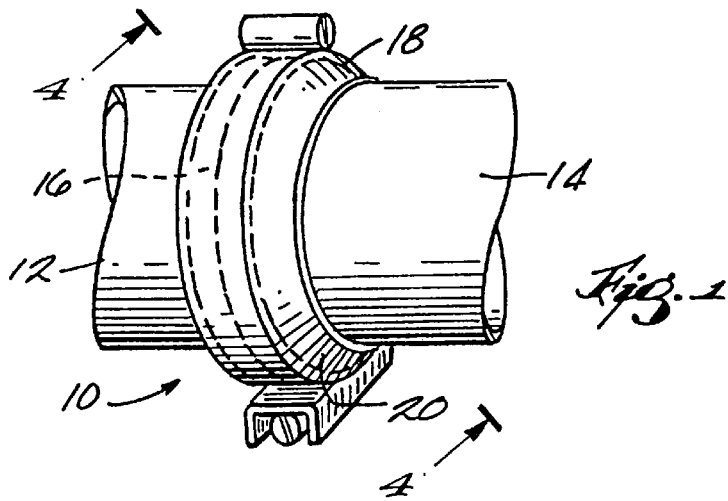
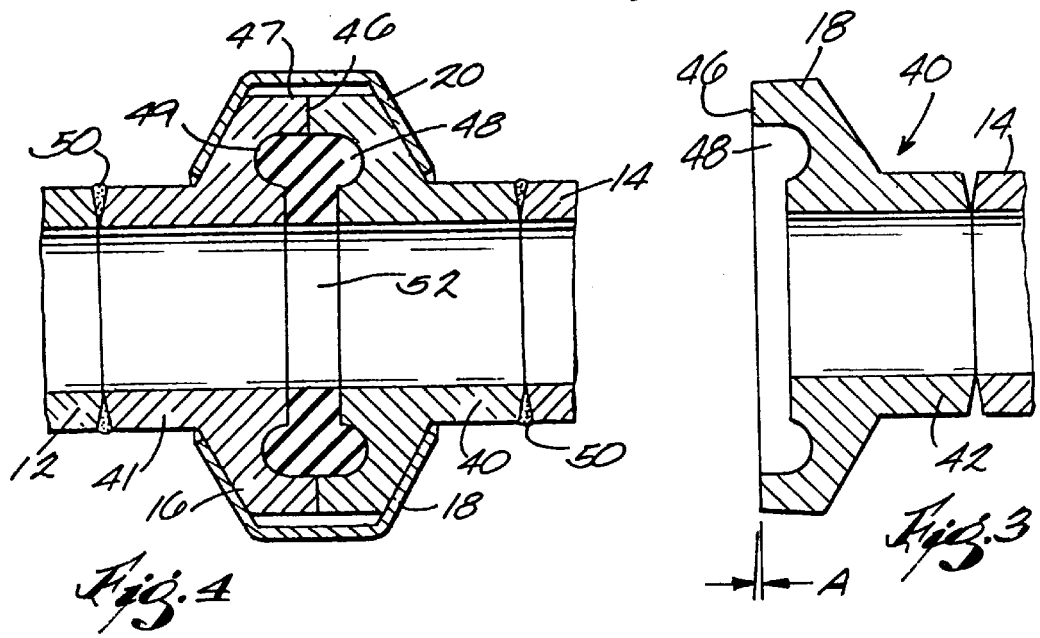
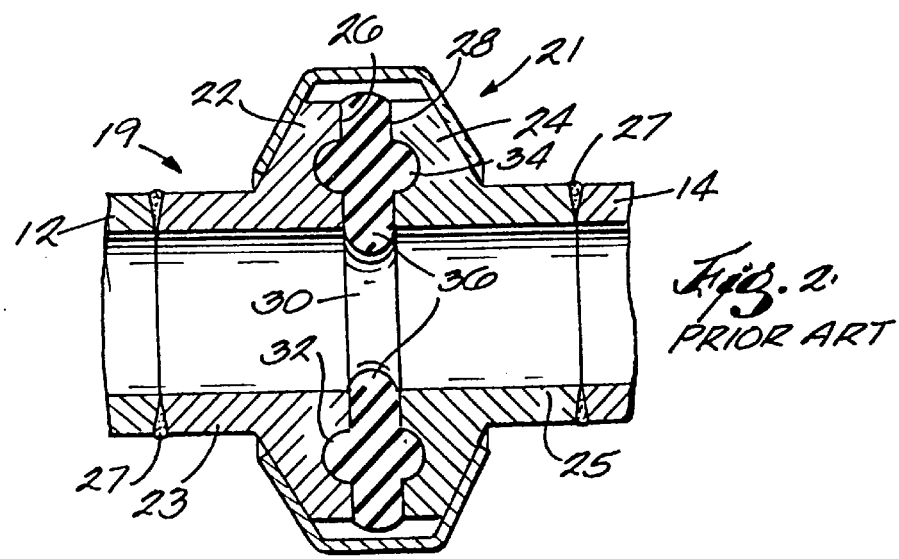

6,045,033

PIPE CONNECTION AND METHOD

BACKGROUND OP THE INVENTION

The present invention relates to end-to-end abutting connection of fluid handling pipes. More particularly, the invention relates to a pipe connection adapted for end-to-end connection of pipes having dissimilar ferrules welded to the ends thereof.

Heretofore, pipes, for example, those used for conveying liquids or flowable food products have often been connected together by attaching abutting flanges to the ends of the pipes. In order to attach such flanges it has been common to manufacture a ferrule having a flange, which ferrule has, at its opposite end, a section having a diameter equal to that of the pipe and is thus adapted to be welded to an end of the pipe. Often it is desired to form and end-to-end connection between pipes having dissimilar end fittings For example, flanges are often provided with grooves in the abutting face surfaces for retention therein of a gasket, in order to ensure a leakproof connection of the two abutting pipe sections. However, to avoid compression and extrusion inwardly into the pipe of the gasket material, thus to avoid partial obstruction of fluid flow in the pipe, ferrules are sometimes provided which use metal-to-metal abutment. It is difficult, however, to effectively connect ferrules adapted for such metal-to-metal abutment with ferrules that are not.

Additionally, a further problem occurs in that when a ferrule is welded to the pipe, there is a tendency for the pipe to shrink slightly in the vicinity of the weld. This causes a small amount of tilting of the faces of the flange away from the central axis so that they will not be able to come into flush abutment with each other.

In view of the foregoing difficulties, a need has existed for an improved flange configuration. A need has also existed for an improved method of forming such flanges on the ends of pipes to ensure a flush face to face contact of the flange ends and leakproof abutment thereof.

SUMMARY OF THE INVENTION

It is an important object of the present invention to provide a new configuration for abutting flanges used for connecting fluid flow pipes in a leakproof end-to-end connection. Another important object of the invention is to provide an improved method of manufacturing pipe sections which have flanges welded thereon and which have abutting flange faces that are perpendicular to the axes of the pipe sections.

In accordance with one aspect of the invention, the pipe is welded to a ferrule which contains the flange structure at an end thereof. In accordance with the further aspect of the invention, the flange surfaces of the ferrule are formed at an angle other than 90° with respect to the central axis of the ferrule. In accordance with a still further related aspect of the invention, the flange surfaces after shrinkage of the material during welding deform a small amount, with such deformation resulting in the flange surfaces assuming an orientation normal to the axis of the ferrules and consequently to that of the pipes to which the ferrules are welded.

Briefly, the invention provides a method of forming lengths of pipe for assembly together to form fluid flow conduits which includes the steps of providing a pipe having a first inner diameter and a central longitudinal axis, providing a ferrule which has an annular first end, having an inner diameter equal to the pipe inner diameter and having a second end formed into a flange adapted to form a flange coupling when abutted against and connected to another similar flange. The flanges have end faces countersunk approximately 1° to 5°. The first end of each ferrule is welded to an end of a pipe, whereby the end face of the flange assumes an orientation wherein the end face is substantially normal to the central longitudinal axis. An improved joint is thus formed.

Further objects and advantages of the invention will become apparent from the following detailed description, the appended claims, and the accompanying drawings.

BRIEF DESCRIPTION OF THE DRAWINGS

FIG. 1 is a fragmentary perspective view of a flange type pipe connection of the present invention;

FIG. 2 is a fragmentary central cross-sectional view of a joint between pipes in accordance with the prior art;

FIG. 3 is a fragmentary central cross-sectional view showing a pipe and flange component in accordance with one embodiment of the invention before welding thereof;

FIG. 4 is a sectional view taken along line 4—4 of FIG. 1 showing an embodiment of the invention;

DETAILED DESCRIPTION OF THE PREFERRED EMBODIMENT

Figure 5:
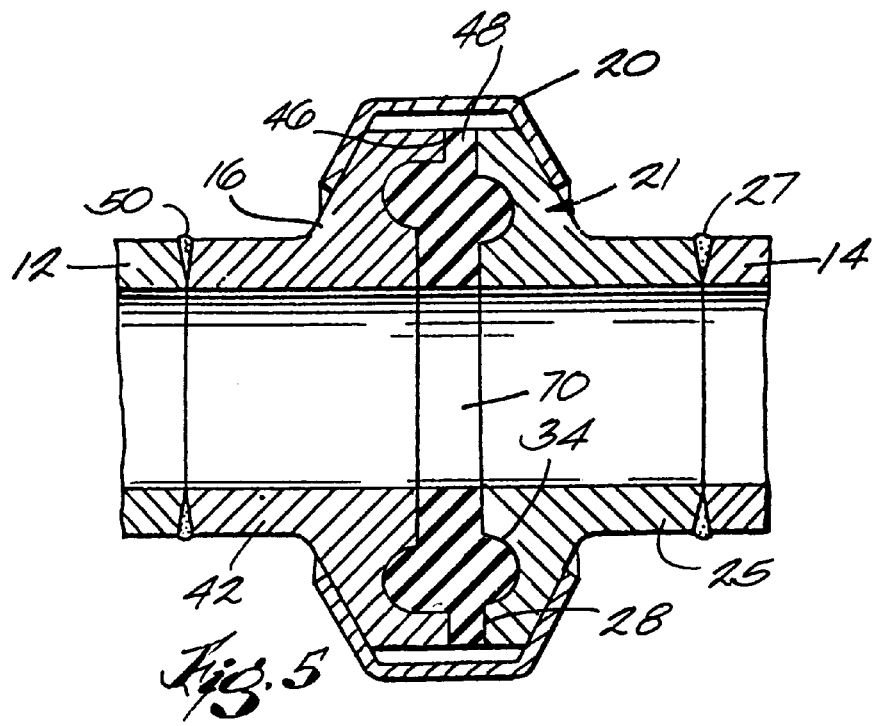
FIG. 5 is a fragmentary central cross-sectional view of a joint between a pipe having an end fitting of this invention with a pipe which has a prior art end fitting joined by a novel gasket; and, FIG. 6 is a sectional view taken along line 4—4 of FIG. 1 showing a modified embodiment of the invention.

Referring more specifically to the drawings there is seen in FIG. 1 a pipe connection 10 connecting pipe sections 12 and 14 which are illustrated in fragmentary fashion. Pipe end flanges 16 and 18 are clamped together by a clamp 20 which may either be a fixed clamp or, alternatively, a type which can be pivoted open, as is known in the art.

FIG. 2 illustrates a prior art type of flange connection arrangement of the prior art which has various shortcomings. In this prior art configuration, ferrules 19 and 21 are provided with flanges 22 and 24 which are integral with sections 23 and 25, respectively. Sections 23 and 25 have the same diameters as pipes 12 and 14. The ferrule ends 23 and 25 are attached by welds 27 to the respective pipe sections 14 and 12. Flanges 22 and 24 have end surfaces 26 and 28 which face each other. These surfaces 26 and 28, however, tend not to be entirely in a plane perpendicular or normal to the central axis of the pipes 12 and 14 due to distortions which occur in the welding process used to produce welds 27. Thus, in order to account for variations in the angle at which the surfaces 26 and 28 face each other, it is necessary that a gasket 30 be used which, as illustrated, extends across the entire surface of faces 26 and 28. To retain gasket 30 in place, the facing surfaces 26 and 28 are each provided with a semi-circular groove 32 and 34, respectively.

However, as seen in FIG. 2, when the flanges 22 and 24 are clamped together, the inward pressure on gasket 30 causes the inner surface 36 to be extruded into the interior of the pipe connection as shown. This results in a flow conduit having an undesired restriction in the vicinity of gasket 30.

Referring to FIG. 3, there is seen one embodiment of an improved ferrule 40 of this invention. Ferrule 40 includes a section 42 having an identical inside diameter to that of pipe section 14 to which it is adapted to be welded. As further seen in FIG. 3, the flange 18, prior to welding, includes a surface 46 which includes a gasket retaining groove 48. As illustrated, surface 46 is countersunk by an angle A. Angle A is preferably between 1 degree and 5 degrees dependent on the dimensions of the pipe 14. In most cases, for example, those involving a pipe having a two to four-inch diameter, it has been found that a countersunk angle A of approximately 2 degrees is most preferred.

Ferrule 40 is shown in FIG. 4 after it has been attached to pipe 14 by means of a weld 50. Similarly, another ferrule 41 has been welded to another pipe 12 by means of a weld 50. Pipes 12 and 14 are then adapted to be attached together by flanges 16 and 18 which are held in place by a clamp 20. Ferrule 41 includes an abutting face 47 and a gasket retaining groove 49 identical to those of ferrule 40.

As seen in FIG. 4, after welding, the faces 46 and 47 have assumed an orientation perpendicular to the axes of pipes 12 and 14. This is due to the fact that some shrinkage occurs during formation of welds 50 so that the countersunk faces shift sufficiently to cause them to assume an orientation perpendicular to the pipe axis. Due to the fact that faces 46 and 47 are perpendicular to the axis, and thus parallel to each other, they can be used to abut each other as seen in FIG. 4. This enables the use of a gasket 52 which fits into the groove defined on opposite sides by indentations 48 and 49. Then, due to the fact that faces 46 and 47 act as a stop, the gasket 52 cannot be unduly compressed. This results in avoidance of extrusion of the gasket 52 into the interior of the conduit formed by the joining of pipes 12 and 14.

FIG. 5 illustrates the joining, in a novel way, of a section of pipe 12, terminated by a ferrule 40 of this invention, with another section of pipe 14 terminated by a prior art ferrule of the type shown in FIG. 2. Such joints are used in instances where it is desired to connect the improved joints of this invention to existing pipes of an installation which has previously been provided with fittings of the prior art of the type of FIG. 2, including a ferrule 21. In order to accommodate such connection a novel gasket 70 is used. Gasket 70 is asymmetric through its central plane such that the left half of gasket 70 viewed in FIG. 5 is identical to one-half of gasket 52 illustrated in FIG. 4. The other half of gasket 70 is identical to gasket 30 as seen in FIG. 2. By means of the use of this asymmetric gasket 70, a leakproof joint can be formed connecting the two dissimilar pipe sections.

Figure 6:
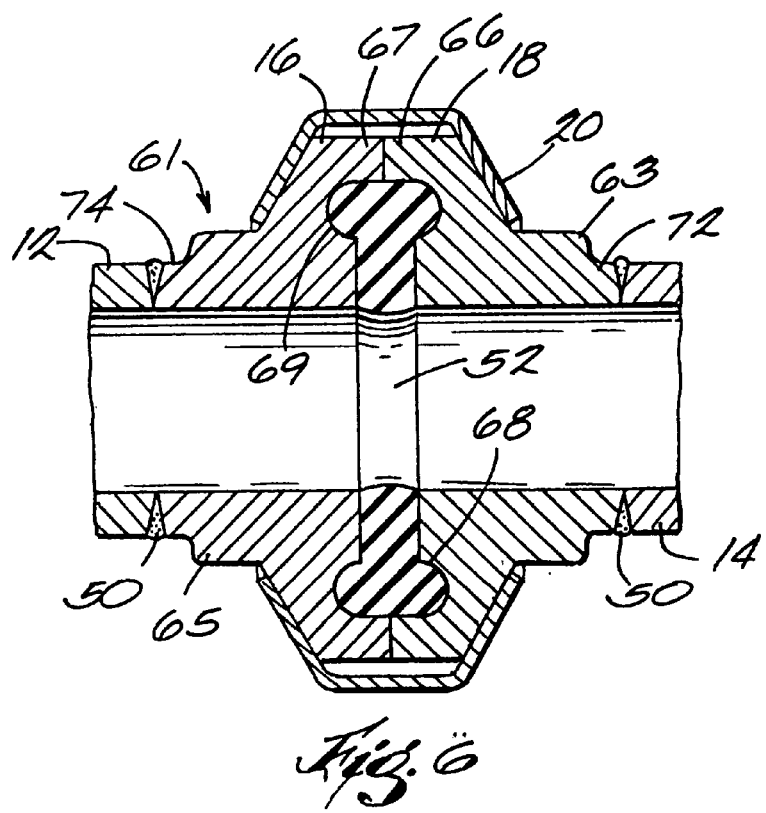

A further embodiment of the invention is seen in FIG. 6. In this embodiment a somewhat modified ferrule 61 is welded to the ends of pipes 12 and 14 by welds 50, as in the case of the earlier-described embodiments. Flanges 16 and 18 allow for the connection of the pipes 12 and 14 using a clamp 20. The ferrules are provided with faces 66 and 67, which, upon welding of the ferrules to pipes 12 and 14, assume an orientation perpendicular to the longitudinal axis of the pipes 12 and 14. The faces 66 and 67 are provided with grooves 68 and 69, respectively, for receiving a gasket 52. As in the case of the earlier embodiments, since the faces 66 and 67 abut each other, the joint of this invention prevents undo compression of gasket 52. Note that gasket 52 does not extend between the flange faces 66 and 67. Because of the reduced compression of gasket 52 as compared with prior art gaskets the gasket material does not extrude significantly into the interior of the flow channel of pipes 12 and 14. The ferrules of the embodiment of FIG. 6 include enlarged shoulders 63 and 65, respectively, which represent areas of substantially greater thickness than that of the adjoining ferrule ends 72 and 74, which are provided for welding of the ferrules to the pipe sections 12 and 14. The thickened sections 63 and 65 improve the ferrules by reinforcing the same. Particularly, the thickened sections 63 and 65 serve to shorten the effective lever arm by means of which the clamp 20 is able to exert forces against the ferrule and the related weld joint.

What is claimed is:

1. A method of forming lengths of pipe adapted to be assembled together to form fluid flow conduits comprising providing a pipe having a first inner diameter and a central longitudinal axis, providing a ferrule which has an annular first end, said first end having an inner diameter equal to said first inner diameter and a central longitudinal axis, said ferrule having a second end formed into a flange adapted to form a flange coupling when abutted against and connected to another similar flange, said flange having an end face on said second end which is inwardly tilted toward its axis approximately 1° to 5°, and, welding said first end of said ferrule to an end of said pipe with the central axis of said ferrule being in linear alignment with the central axis of said pipe, whereby said end face of said flange on said second end of said ferrule assumes an orientation wherein said end face is substantially normal to said central longitudinal axis.

2. A method according to claim 1 wherein said pipes have a diameter of about 1 to 10 inches.

3. A method according to claim 1 wherein said ferrule comprises an intermediate portion between the ends thereof, said intermediate portion having a thickness substantially greater than that of said first end.

* * * * *